United States Patent
Shirashoji

[15] 3,643,149
[45] Feb. 15, 1972

[54] SYSTEM FOR CONTROLLING DC POWER

[72] Inventor: Akira Shirashoji, Amagasaki, Japan
[73] Assignee: Mitsubishi Denki Kabushiki Kaisha, Tokyo, Japan
[22] Filed: Aug. 28, 1969
[21] Appl. No.: 853,836

[30] Foreign Application Priority Data
　　Feb. 7, 1969　Japan..................................44/9079

[52] U.S. Cl..................................321/2, 318/111, 318/345, 321/18, 321/27, 323/22 SC, 323/DIG. 1
[51] Int. Cl......................................H02m 1/08, H02m 3/32
[58] Field of Search....................318/341, 317, 345; 321/54, 321/2, 18, 27; 323/22 SC, DIG. 1; 307/240, 242

[56] References Cited

UNITED STATES PATENTS

| | | | |
|---|---|---|---|
| 3,332,008 | 7/1967 | Mueller et al. | 318/345 X |
| 3,496,444 | 2/1970 | King et al. | 321/2 |
| 3,355,646 | 11/1967 | Tatsuo Goto | 318/341 X |
| 3,360,709 | 12/1967 | Etter | 318/341 X |

OTHER PUBLICATIONS

IEEE transactions on Magnetics. Sept. 1967 EIICHiOHNO et al. pp. 232–236

Primary Examiner—Thomas J. Kozma
Assistant Examiner—H. Huberfeld
Attorney—Robert E. Burns and Emmanuel J. Lobato

[57] ABSTRACT

The disclosed DC power control system comprises $n$ choppers connected in parallel to control vehicle motors and a comparison circuit for comparing a pattern current for the motors with the actual motor current to produce an error signal between them. The output from the circuit is clamped at such a predetermined magnitude that the choppers are each controlled to have a conduction time equal to any multiple of the chopping period divided by $n$ at a given period at which the motor is operated in a predetermined control mode. The given period corresponds to the period during which a control handle is disposed at a given control notch of a conventional controller.

2 Claims, 8 Drawing Figures

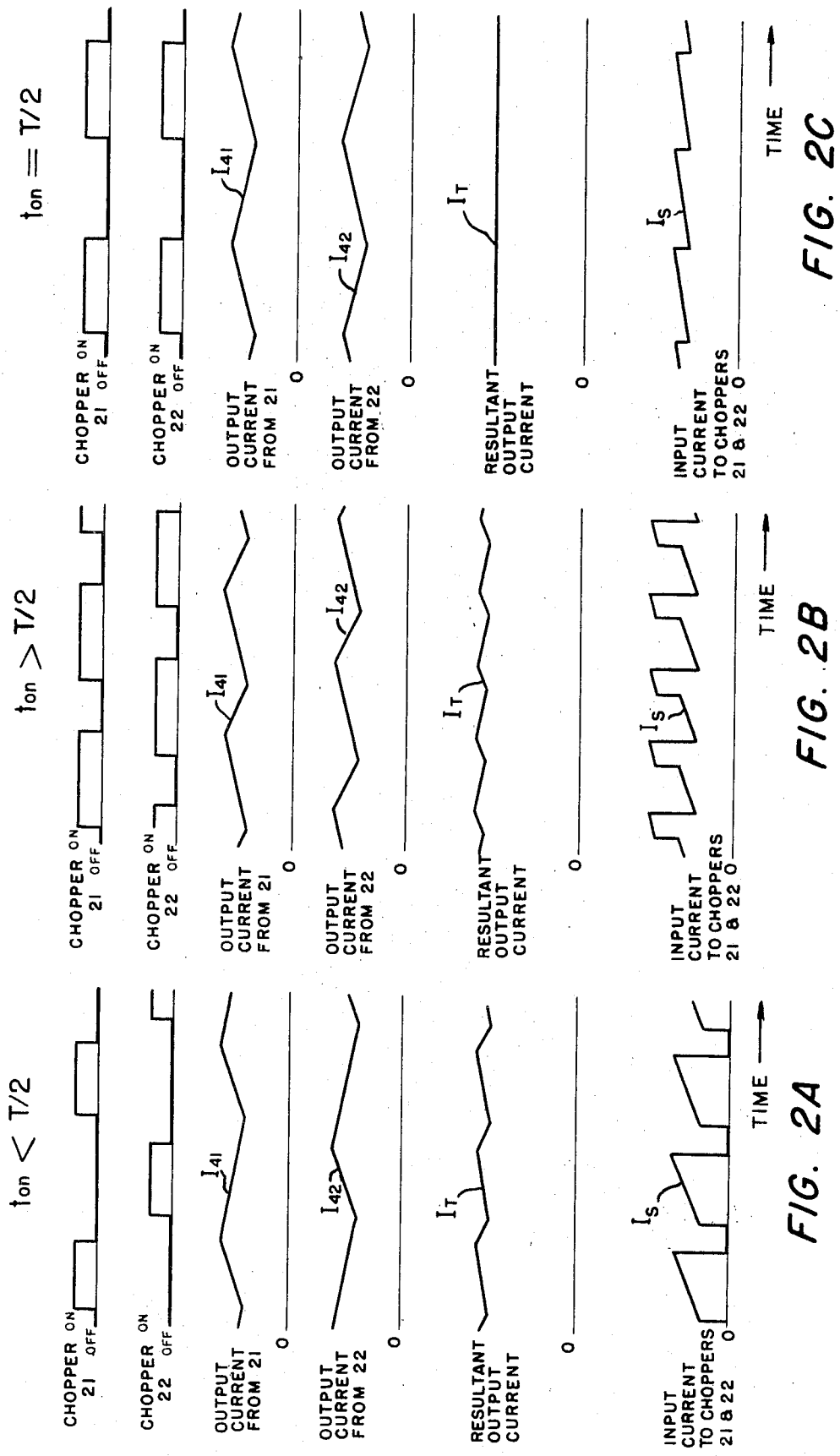

3,643,149

SYSTEM FOR CONTROLLING DC POWER

BACKGROUND OF THE INVENTION

This invention relates to a system for controlling a direct current DC power so as to reduce the overall average magnitude of inductive interference over the entire time of operation.

If the chopper device is used in controlling DC powers, the input current thereto generally includes a high ripple portion produce harmonic components. These harmonic components variously affect external electric circuits and equipments which has been heretofore called in question. To alleviate this question polyphase multiplex chopper systems have been already developed with success. However, when applied to the operation of electric vehicles driven with the DC power, those systems have various disadvantages. For example, on the so-called stop notch on which the controlled electric motors disposed on the vehicle continue to be driven while they are maintained in a predetermined mode of operation an input current to the chopper system includes a high ripple portion leading to the inductive interference with the surrounding electric equipments.

SUMMARY OF THE INVENTION

Accordingly it is an object of the invention to provide a new and improved a chopper system for controlling a DC power which system is alleviated in inductive interference caused from a ripple portion of an input current to the same and in adverse effects resulting from harmonic currents flowing through the system.

It is another object of the invention to provide a new and improved chopper system for controlling a DC power while alleviating the inductive interference caused from a ripple portion of an input current to the system and the adverse effects resulting from harmonic currents flowing through the system on the so-called stop notch on which the controlled electric motors involved continue to be driven while they are maintained in a predetermined mode of operation.

The invention accomplishes these objects by the provision of a DC power control system including $n$ chopper devices where $n$ is an integer except for one, and control means for controlling the operation of the chopper devices such that the devices are successively fired with predetermined phase differences thereby to control a DC power, characterized in that a ratio of conduction time to chopping period of each chopper device is selected to be equal to an integral multiple of the reciprocal of $n$ and preferably on the stop notch on which a controlled electric motor involved continues to be driven while the electric motor is maintained in a predetermined control mode of operation.

BRIEF DESCRIPTION OF THE DRAWINGS

The invention will become more readily apparent from the following detailed description taken in conjunction with the accompanying drawing in which:

FIGS. 2A, B and C are waveforms of current developed at various points in a two phase duplex chopper system such as the system illustrated in FIG. 1 in the respective modes of operation;

DESCRIPTION OF THE PREFERRED EMBODIMENT

Figure 1:
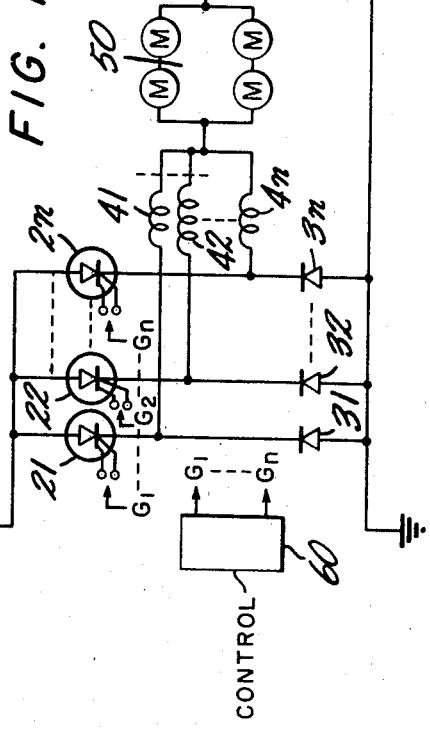
FIG. 1 is a schematic circuit diagram of a polyphase multiplex chopper system constructed in accordance with the principles of the invention.

Referring now to the drawings and FIG. 1 in particular, there is illustrated a polyphase multiplex chopper system of the conventional construction applied to the operation of electric vehicles driven with the DC power. The arrangement illustrated comprises a source of DC power represented by a feeder 10, a pantograph 12 movably contacting the feeder 10, a plurality of chopper devices 21, 22, . . ., 2$n$ electrically connected in parallel circuit relationship to each other and serially connected to the pantograph 12, and a plurality of semiconductor flywheel diodes 31, 32, . . ., 3$n$ serially connected to different ones of the chopper devices. The chopper devices are shown as including gate electrodes $G_1$, $G_2$, . . ., $G_n$ respectively. The diodes are reversed in polarity from the associated chopper devices and has their anode electrodes electrically connected to a return feeder symbolically represented by the symbol "GROUND." The junction of each chopper device and the associated diode is electrically connected through an individual reactor 41, 42, . . ., or 4$n$ to a load generally designated by the reference 50. The load is shown in FIG. 1 as including four DC motors interconnected such that each pair of motors serially connected to each other are connected in parallel to the other pair only for purpose of illustration. The load 50 is electrically connected to the return feeder as above described. In order to close and open the chopper devices 21, 22, . . ., 2$n$ in succession with predetermined phase differences, a control system 60 is adapted to successively apply gating signals to the gate electrodes $G_1$, $G_2$, ..., $G_n$ of the chopper devices to close and open the latter in the well-known manner. It will be readily understood that all the components as above described except for the feeder 10 and the return feeder are equipped on an electric vehicle (not shown).

Assuming that $n$ is equal to 2 only for purpose of simplification, the operation of the arrangement illustrated in FIG. 1 will now be described in conjunction with FIGS. 2A, B and C. In the assumed condition a pair of chopper devices for example, the devices 21 and 22 are alternately turned "ON" and "OFF" with a time differential of $T/2$ between the turning "ON" of one of the choppers and the succeeding turning "ON" of the other chopper where T is the system period with which the chopper devices each are successively turned "ON" and "OFF." That is the chopper devices each perform the chopping operation with the period of T.

It is now assumed that the chopper devices 21 and 22 each has a conduction time $t_{on}$ less than one half the system period T. FIG. 2A shows waveforms developed under the assumed condition. More specifically, the chopper devices 21 and 22 are put in the ON-OFF mode of operation as shown at waveforms (a) and (b) in FIG. 2A. When in their ON position, the devices provide output currents $I_{41}$ and $I_{42}$ as illustrated at waveforms (c) and (d) in FIG. 2A. The currents $I_{41}$ and $I_{42}$ then flow through the respective reactors 41 and 42 into the load 50. Therefore a current flowing through the load 50 is equal to the resultant output current $I_T$ as shown at waveform (e) in FIG. 2A derived from both the reactors 41 and 42. Under these circumstances, a current drawn from the source 10, that is, an input current $I_S$ to both the chopper devices is equal to the sum of currents flowing through the respective devices in the "ON" position respectively. The input current $I_S$ is shown at waveform (e) in FIG. 2A.

By comparing the waveform (e) with the waveforms (c) and (d) shown in FIG. 2A, it is seen that the resultant current $I_T$ includes a ripple portion having an amplitude decreased to a magnitude equal to or less than one half the ripple amplitude developed when the chopper devices and therefore the reactors separately supply the respective output currents to the load.

With the conduction time $t_{on}$ greater than one half the system period T, the chopper devices are put in the "ON-OFF" mode of operation as shown at waveforms (a) and (b) in FIG. 2B with the chopper devices overlapping each other in conduction time. Under these circumstances the chopper devices 21 and 22 provide output currents $I_{41}$ and $I_{42}$ as shown at waveforms (c) and (d) in FIG. 2B. Therefore as in the previous case, the load 50 has flowing therethrough a current equal to the resultant output current $I_T$ as shown at waveform (e) in FIG. 2B derived from both the reactors 41 and 42. Also an input current $I_S$ to the chopper devices is similar equal to currents flowing through the devices in the "ON" position respectively and is represented at waveform (f) in FIG. 2B.

Thus it will be appreciated that the resultant current $I_T$ flowing through the load includes a ripple having an amplitude decreased by a factor of two or more as compared with the case the chopper devices and therefore the reacroes separately supply the respective output currents to the load.

If the conduction time $t_{on}$ is equal to one-half the system period T then one of the chopper devices is turned "ON" while at the same time the other chopper devices is turned "OFF" and vice versa as shown at waveforms (a) and (b) in FIG. 2C. In other words, only one of the chopper devices is put in its "ON" position at a time with the choppers alternating each other in the "ON" position. Thus the chopper devices 21 and 22 and therefore the reactors 41 and 42 provide output currents $I_{41}$ and $I_{42}$ as shown at waveforms (c) and (d) and a current $I_T$ flowing through the load becomes a smoothed direct current as shown at waveform (e) because a ripple included in each of the output currents offsets a ripple included in the other output current.

As above described, only one of the choppers is necessarily put in its "ON" position at a time. Therefore an input current $I_S$ supplied to the chopper devices by the source 10 has a ripple portion minimized as shown at waveform (f) in FIG. 2C. In other words, harmonic components due to the ripple portion is minimized.

The description above made in terms of n=2 can be equally applied to the case of n=3. It will be readily understood that if the chopper devices have a conduction time $t_{on}$ equal to one-third the system period T that any one of the chopper devices is always put in its "ON" position with the result that the chopper devices provide a smoothed direct current for the load while the devices have applied thereto an input current minimized in ripple as in the case of FIG. 2C. If the conduction time $t_{on}$ is equal to two-thirds the system period T then the chopper devices will supply to the load the output current minimized in ripple with the input current thereto also minimized.

Similarly it will be appreciated that in the arrangement of FIG. 1 wherein the n chopper devices 21, 22, ..., 2n are used for the purpose of controlling the DC power supply to the load 50, the input and output currents $I_S$ and $I_T$ respectively are similarly minimized in ripple provided that the chopper devices have a conduction time $t_{on}$ equal to any one of $1/n$, $2/n$, ..., $(n-1)/n$ of the system period T, that is to say, any integral multiple of the system period T divided by n.

In electric vehicles driven with the DC power, it is generally practiced to provide several notches which are selectively put in operation by the operator. An each of the notches control of voltages applied across the so-called main electric motors involved or control of the energization of their fields is finally fixed to a certain constant magnitude. Each of such notches is adapted to be consecutively used and may be called sometimes a stop notch. For example, there are generally provided a series notch on which a plurality of main electric motors involved are serially interconnected, a parallel notch on which the main motors are interconnected in parallel, and a field-weakening notch on which the fields of the main motors are weakened. Those notches each can be used as the stop notch having a relatively large portion of the power running period. However, if the conventional type of resistance control systems for electric vehicles is consecutively operated while series resistors involved are inserted into the system then a loss in electric power is not only high but also the resistors must be high in capability leading to economical disadvantages and drawbacks that it has a heavy weight and large space occupied thereby. This has inevitably resulted in control of the main motors having the associated series resistors fully short circuited on the particular stop notch.

On the other hand, the chopper systems such as previously described in conjunction with FIG. 1 can effect the process of controlling the speed of the associated main electric motors in which a large amount of electric power is not consumed as in the resistance control systems. This permits the stop notch to be set by fixing a ratio of the conduction time $t_{on}$ of the choppers to the system period T or $t_{on}/T$ to any magnitude while the main motors are maintained in their predetermined connection without changing their connection.

Where the conventional polyphase multiplex or single phase chopper systems are to effect a constant voltage control by fixing the controlled phase angles of the choppers for a certain control effected in the process of controlling the applied voltage it has been heretofore practiced to set the phase angle to be fixed to any magnitude. This has led to the operation of the systems with a very high-ripple percentage and therefore has been undesirable in view of the standpoint of the inductive interference and the harmonic components due to the ripple circuit.

The invention contemplates to decrease the inductive interference caused from the ripple developed in an input current drawn by chopper devices involved and the adverse effects resulting from harmonic current portions developed on the input and output sides of the chopper devices.

Figure 3:
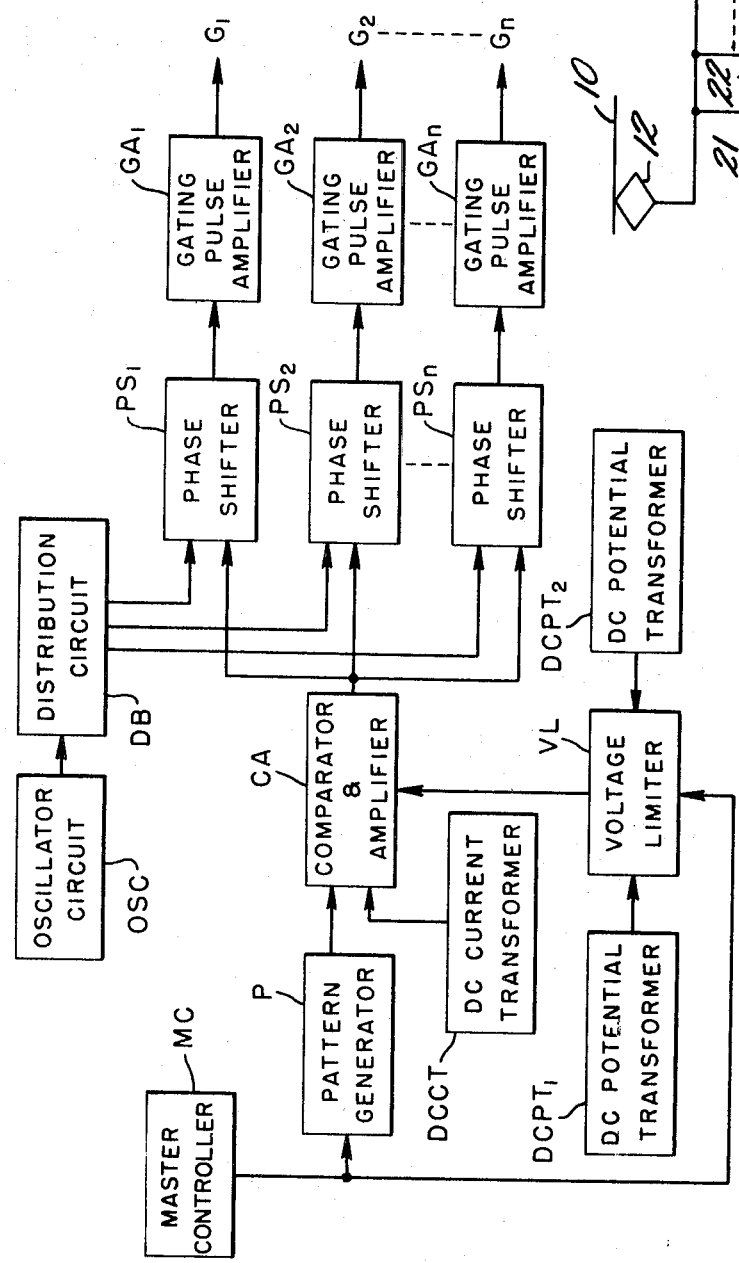
FIG. 3 is a block diagram illustrating the details of the control system shown in FIG. 1.
Figure 4:
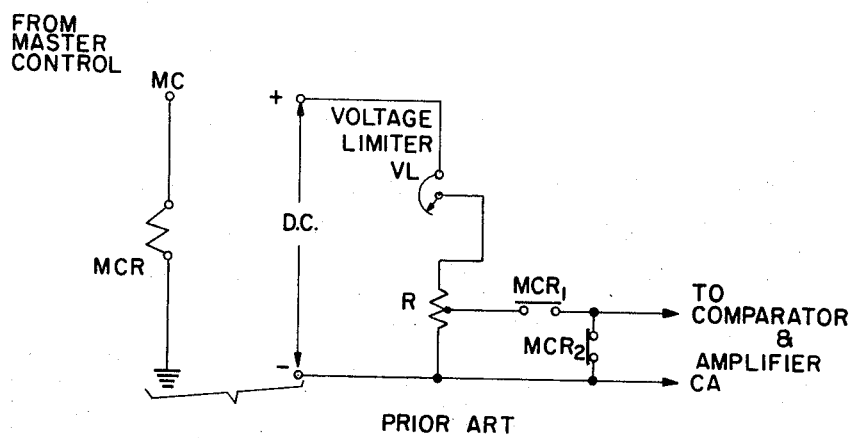
FIG. 4 is a circuit diagram of one form of the pattern generation circuit shown in FIG. 3.
Figure 5:
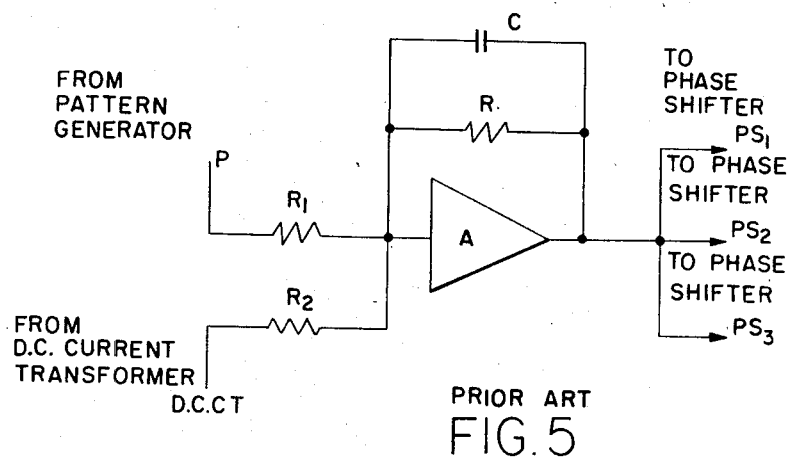
FIG. 5 is a circuit diagram of one form of the comparison and amplification circuit shown in FIG. 3.

Referring now to FIG. 3, there is illustrated one form of the control system as shown at block 60 in FIG. 1 for the purpose of effecting control on the stop notch as above described. That is, FIG. 3 shows the details of the control system such as illustrated at block 60 in FIG. 1. The arrangement illustrated comprises a main controller MC manipulated by the operator, a pattern generation circuit P connected to the output of the master controller MC, and a combined comparison and amplification circuit CA connected to the output of the pattern generation circuit P. The master controller MC is of the conventional construction and includes a manually operated handle moved selectively for engaging separate control notches to control the vehicles speed as the handle is moved from one notch to the other. The pattern generation circuit P is preferably in a circuit configuration as shown in FIG. 4. A relay MCR responds to a command from the master controller MC to close its normally open contacts $MCR_1$ and open its normally closed contact $MCR_2$. This permits a DC voltage to be applied to the comparison and amplification circuit CA through a load responsive resistor VL, a fixed resistor R and the now closed contacts $MCR_1$. The load responsive resistor VL is variable in magnitude of resistance in accordance with a load on the associated electric vehicle. That is, the pattern generation circuit P responds to a command from the master controller MC to generate a pattern voltage for determining a current flowing through a circuit with the associated main electric motors (not shown in FIG. 3) such as the load 50 as illustrated in FIG. 1. The combined comparison and amplification circuit CA is an operational amplifier of the well-known type such as shown in FIG. 5. As shown in FIG. 5, an operational amplifier A includes a parallel combination of a capacitor C and a resistor R connected between its input and output. The pattern generation circuit P is connected to the input to the amplifier A through a resistor $R_1$ while a current transformer DCPT of direct current type is connected to the input to the amplifier A through a resistor $R_2$. The transformer DCPT is operative to detect the current flowing through the above-mentioned circuit with the set of the main motors to provide a voltage proportional to the detected current. That voltage is then compared with the pattern voltage from the circuit P in the comparison and amplification circuit CA which, in turn, produces and amplifies a difference between both the voltages, that is, an error of the voltage from the transformer DCCT relative to the pattern voltage from the circuit P. The output of the circuit CA is connected to phase shifter circuits $PS_1, PS_2, ..., n$.

As shown in FIG. 3, an oscillation circuit OSC of the conventional construction is provided for producing pulses at predetermined intervals of time thereby to determine the overall frequency with which a plurality, in this case, n of chopper devices such as shown in FIG. 1 are adapted to be successively operated. The overall frequency of the chopper devices varies with a change in pulse spacing between the pulses produced by the oscillation circuit OSC. The pulses from the circuit OSC are supplied to a distribution circuit DB which, in turn, distributes the pulses in a predetermined order among a plurality, in this example, n of phase shifter circuits $PS_1, PS_2, \ldots, PS_n$ having also applied thereto the error voltage provided by the combined comparison and amplification circuit CA. The distribution circuit DB may be a three stage flip-flop. Thus the phase shifter circuits $PS_1, PS_2, \ldots, PS_n$ are successively put in operation with predetermined phase differences therebetween by virtue of the pulses applied thereto from the distributor circuit DB while at the same responding to the error voltage provided by the comparison and amplification circuit CA to produce control signals for determining the conduction time $t_{on}$ of the associated chopper devices. Then the control signals are amplified by the pulse amplifiers $GA_1, GA_2, \ldots, GA_n$ respectively after which they are applied to the associated gate electrodes $G_1, G_2, \ldots, G_n$ of the chopper devices (see FIG. 1) as shown at the arrows $G_1, G_2, \ldots, G_n$ in FIG. 3, for firing the devices.

The components as above described a looped current control system by which a current flowing through the main motor set is controlled so as to be proportional to the pattern voltage generated by the pattern generation circuit P. For example, if the number of revolution in unit time of the main motor set increases, the conduction time $t_{on}$ of the chopper devices is correspondingly lengthened to increase the product of the voltage applied across the main motor set multiplied by the ratio of $t_{on}/T$ thereby to maintain the total output current from the chopper devices at a substantially predetermined magnitude.

In FIG. 3, the master controller MC is also shown as being connected to one input to a voltage limiter circuit VL having two other inputs connected to a pair of potential transformers $DCPT_1$ and $DCPT_2$ of direct current type respectively.

Figure 6:
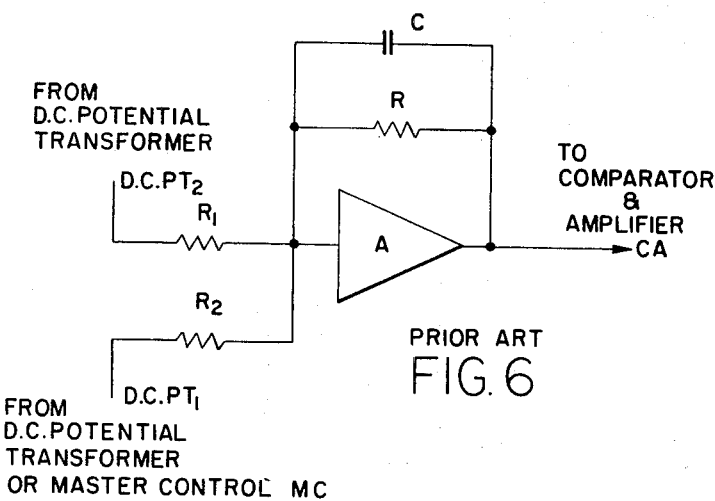
FIG. 6 is a circuit diagram of one form of the voltage limiter circuit shown in FIG. 3.

The voltage limiter circuit VL may be a comparison circuit as shown in FIG. 6. The circuit illustrated is similar to the comparison circuit shown in FIG. 5. Therefore like reference characters designate the identical components in both FIGS. In FIG. 6, the resistor $R_1$, has the output from the DC potential transformer $DCPT_2$ applied thereto while the resistor $R_2$ has the output from the DC potential transformer $DCPT_1$ in the brake control mode of operation. The circuit compares both outputs from the transformers with each other. However, in power running, the resistor $R_2$ has a command signal from the master controller MC. Therefore, the circuit VL compares a command signal with the output from the transformer $DCPT_2$. At the stop notch, the circuit is operative to produce an output when the output from the transformer $DCPT_2$ exceeds the output from the master controller MC.

In FIG. 3, the master controller MC is also shown as being connected to one input to a voltage limiter circuit VL having two other inputs connected to a pair of potential transformers $DCPT_1$ and $DCPT_2$ of direct current type respectively. The potential transformers $DCPT_1$ and $DCPT_2$ serve to detect a feeder voltage or an input voltage to the chopper devices and a voltage across the main motor set respectively to supply them to the voltage limiter circuit VL. The voltage limiter circuit VL is responsive to a command for a stop notch issued by the main controller MC to establish a limit of voltage in terms of its proportion to the input voltage to the chopper devices or the feeder voltage as detected by the potential transformer $DCPT_1$.

If the output voltage from the chopper devices or the voltage across the main motor set as detected by the potential transformer $DCPT_2$ exceeds in magnitude the limit of voltage established by the voltage limiter circuit VL then a control signal is provided by the limiter circuit VL. Then that control signal is applied to the combined comparison and amplification circuit CA with the porality reversed from that of the pattern voltage as above described. This permits the above-mentioned constant voltage control to be controlled by the voltage limit circuit VL thereby to fix a ratio of output to input voltage for the chopper devices and therefore the ratio of $t_{on}$ to T thereof to a magnitude corresponding to the limit of voltage established by the voltage limiter circuit VL.

If in the control system as above described, the magnitude of voltage limit established by the voltage limiter circuit VL is selected to render the ratio of $t_{on}$ to T of the chopper devices equal to any integral multiple of the reciprocal of $n$ or any one of $1/n, 2/n, \ldots, (n-1/n)$ where $n$ is the number of the chopper devices then it is possible to minimize ripple portions of currents supplied to and provided by the chopper devices on the stop notch as will be readily understood from the description previously made in conjunction with FIGS. 2A, B and C.

The utility of the established magnitudes of voltage limit as above described will now be discussed. With two choppers used ($n=2$), that is, with the established magnitude of voltage equal to $t_{on}/T=1/2$ in the two phase duplex system, the chopper devices each provides its output voltage equal in magnitude to one-half its input voltage. This corresponds to the series notch in the conventional resistance control systems effecting the series and parallel controls for the main electric motors involved.

If instead of the conventional control systems effecting the full field series and parallel controls and the field-weakening control for parallel connection, the chopper system is used to control the main electric motors having the full field characteristics substantially corresponding to the field-weakening characteristic of the above-mentioned systems then this eliminates the necessity of providing field-weakening means and permits single control to be effected with the chopper system alone. This results not only in the simplification of the apparatus and devices involved but also in a wide speed range capable of being used with the full field of the motors is widened. This wide speed range leads to the advantage that the dynamic braking can be applied starting with a speed higher than a speed at high it could previously begin to be applied whenever it is desired to do so. In such a case, assuming that the number ($n$) of the chopper devices is preselected to be three (3) while the stop notch is set to correspond to each of one-third and two-thirds the ratio of the conduction time $t_{on}$ to the system period T, they are possible to approximately correspond to the full field series and parallel controls effected by the conventional control systems. This measure is favorable for the operation of the present system combined with the conventional type of control systems.

While the invention has been illustrated and described in terms of an electric vehicle it is to be understood that the same is equally applicable to control of DC powers apparatus other than such a vehicle:

What is claimed is:

1. A DC power control system comprising, n chopper devices connected in parallel circuit relationship where n is an integer other than the integer one, a DC load controlled by said chopper devices, a master controller, a pattern generation circuit responsive to a command from said master controller to generate a pattern for the load current, a DC current transformer for detecting the actual load current to produce an output signal in accordance with the detected load current, a comparison circuit for comparing said pattern for the load current with the output signal from said DC current transformer to produce an output dependent upon an error signal therebetween for controlling the conduction time of each of said chopper devices, and a limiter circuit responsive to a given command from said master controller to limit the output from said comparison circuit to control the conduction time of each of said chopper devices so as to maintain said DC load in a predetermined control mode of operation, said limiter circuit having means effective during application of said command to limit the output from the comparison circuit to render a ratio of conduction time $t$ to chopping period T of each of said chopper devices equal to an integral multiple of the reciprocal to $n$.

2. A DC power control system comprising $n$ chopper devices interconnected in parallel circuit relationship where $n$ is an integer other than one, a DC load controlled by said chopper devices, a master controller, a pattern generation circuit responsive to a given command from said master controller to generate a pattern for the load current, a DC current transformer for detecting the actual load current to produce an output signal in accordance with the detected load current, a comparison circuit for comparing said pattern for the load current from said pattern generation circuit with the output signal from said DC current transformer to produce an output dependent upon an error signal therebetween for controlling the conduction time of each of said chopper devices, a DC potential transformer detecting output voltages from said chopper devices, and a limiter circuit responsive to the output from said DC potential transformer in excess of a predetermined magnitude to produce an output to limit the output from said comparison circuit, said predetermined magnitude being selected to be equal to an operating magnitude at which said comparison circuit is operative to control each of said chopper devices maintaining a ratio of conduction time $t_n$ to chopping period T of each of said chopper device equal to an integral multiple of the reciprocal of $n$ while said DC load is operated in response to said given command and in a mode based upon said predetermined magnitude.

* * * * *